March 6, 1945.　　　J. J. McKEAGUE　　　2,370,870
SAFETY DEVICE
Filed Sept. 22, 1943
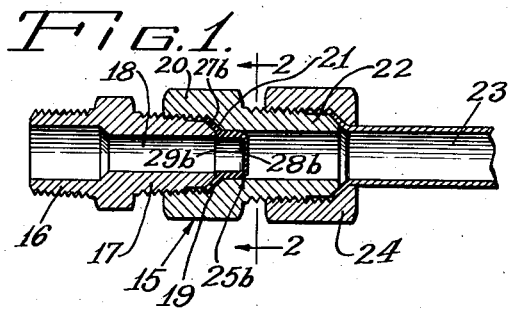
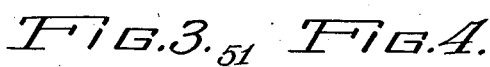
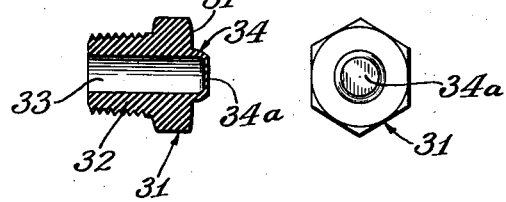
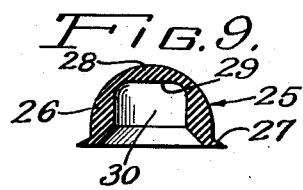
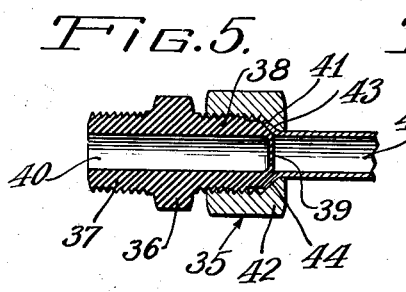
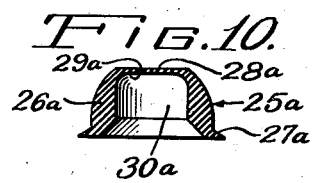
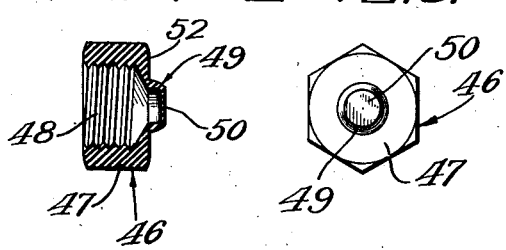
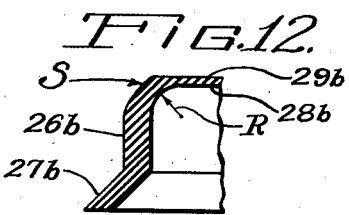
Inventor:
James J. McKeague
By Wallace and Cannon
Attorneys Patented Mar. 6, 1945

2,370,870

UNITED STATES PATENT OFFICE 2,370,870

SAFETY DEVICE

James J. McKeague, Chicago, Ill.

Application September 22, 1943, Serial No. 503,399

26 Claims. (Cl. 220—89)

This invention relates to safety devices and, more particularly, to rupturable safety devices of the character which may be used at various points in refrigerating systems, such as in association with absorbers, liquid receivers, condensers and generators therefor; in steam boilers, air conditioning systems, chemical reaction vessels, fire extinguishing apparatus, oil production and refining vessels where gases or vapors may be maintained under pressure, and in like or analogous gas or vapor pressure systems and vessels for relieving pressures which may become dangerously high above normal operating pressures due to heat, to blocking in the system, or to other cause which might induce an explosion or bursting in a gas or vapor pressure system or vessel.

It has been common practice heretofore to employ in connection with refrigerating systems and in other gas pressure systems and vessels rupturable safety devices or heads for the purpose of relieving gas or vapor pressures which may become dangerously high due to heat from fire on the premises, to failure of a pressure relief safety valve, to a blocking in the system, or to other cause.

In general it may be said that probably the most extensively used of such safety devices or heads has been comprised of a thin rupturable metallic diaphragm or disc which will rupture under a predetermined gas or vapor pressure which has become dangerously high, and a pair of annular clamping flanges each having a central opening therein for the reception of the rupturable metallic diaphragm. Such clamping flanges or rings are customarily clamped in position of use upon a gas or vapor pressure line or vessel with which the rupturable metallic diaphragm or disc may be associated. In the use of such prior safety devices or heads the rupturable metallic diaphragm or disc is usually clamped in position of use upon a seat formed in one of the cooperating clamping flanges or rings and at least one of the clamping flanges is threaded onto or otherwise secured to the pressure line or pressure vessel with which the safety device is to be used to the end that if the gas or vapor pressure in the line or vessel becomes dangerously high it will rupture the metallic diaphragm and either discharge the gas or vapor directly to the surrounding atmosphere or to a vent line depending, of course, upon whether the gas or other fluid employed under pressure is of a toxic or irritant character, the nature of the pressure system or vessel with which the safety device or head is used, and other factors.

There are, however, a number of objections to the use of such prior safety heads or devices and among these are the following: there is a tendency of the centrally apertured annular or like clamping flanges or rings to exert a compressive shearing action upon the marginal or peripheral edge portions of the rupturable metallic diaphragm or disc when the clamping flanges or rings are tightened to clamp the rupturable metallic diaphragm or disc therebetween and upon its seat; there is an inherent and always present danger that when such rupturable metallic discs or diaphragms are employed in connection with gases or vapors of an explosive character the rupturing or tearing of such metallic diaphragms or discs will cause sparks and an explosion in the pressure system or vessel with such safety devices or heads are used; the use of such annular or like shaped clamping flanges or rings surrounding the external surface of a pressure line with which such safety devices or heads are used necessarily limits the extent to which such prior safety devices or heads can be installed and used; such prior safety devices or heads are relatively expensive to manufacture in that they employ a considerable amount of material and a substantial number of parts in the manufacture thereof; and the metallic diaphragms or discs of such prior safety devices are subject to corrosion by the gases or vapors to which they may be exposed in pressure lines or vessels as well as by water, air and moisture from the atmosphere or other external source.

Accordingly, an object of the present invention is to provide a novel and improved safety device which in use is free from the foregoing and other objectionable features and characteristics of prior safety devices or heads and which has the desirable advantages or characteristics inherent in the present invention and to certain of which reference will be made hereinafter.

Another object of the present invention is to provide, in one aspect thereof, a new and improved safety device or head embodying a rupturable cap or disc which may be made in various forms and sizes and which may be employed in conjunction with standard S. A. E. unions or couplings of various sizes and shapes in conjunction with pressure lines, openings in pressure vessels, and the like.

Another object of the present invention is to provide a new and improved safety cap or disc which may be made of various synthetic thermoplastic materials including various synthetic flexible elastic resins, such as "Saran" (Dow Chemical) and which is a thermoplastic vinylidene chloride resin, "Resistoflex" (Resistoflex Corporation), as well as selected of the various synthetic vulcanizable rubbery elastoprenes or elastoplastics which are referred to in J. I. E. C., vol. 34, No. 2, pp. 243 to 251, inclusive, (February, 1942), including the chlorinated butadiene hydrocarbon polymerizates such as "Neoprene" or "DuPrene" and the like.

Another object of the present invention is to provide, in one embodiment thereof, a new and improved safety device in the form of a plug comprising a body which is made of a flexible synthetic resinous or other flexible elastic synthetic plastic material and including an externally threaded portion which is adapted to be threaded into a pressure line or into a tapped opening in a pressure vessel and which plug includes a relatively thin rupturable flexible wall composed of the same material as that of which the body of the plug is composed whereby the body of the plug may be made in various standard sizes and threads for insertion into a pipe, conduit, tapped opening in a gas pressure vessel or the like, and to the end that the thin rupturable wall will rupture at a predetermined pressure to relieve dangerously high gas or other fluid pressure in the line or vessel with which the new safety device may be associated.

A further object of the invention is to provide an improved safety device in the form of an externally threaded flare union having a flexible rupturable wall formed integrally therewith at one end thereof.

Another object of the invention is to provide a safety nut which comprises an internally threaded body composed of one of the thermoplastic synthetic resinous or other elastic plastic materials hereinbefore referred to and adapted to be screwed onto an externally threaded pipe, coupling or the like of standard size, and so as to form an effective gas tight seal without necessitating the use of a gasket, and the body of said nut having a relatively thin flexible rupturable wall at one end thereof and which is adapted to rupture under a predetermined pressure so as to relieve a dangerously high gas or other fluid pressure in the line with which the new rupturable safety nut may be employed.

Another object of the invention resides in constructing a novel rupturable cap or disc, which is embodied in one form of the invention, in such a manner that when it is disposed in position between the parts of a flared union and the parts of the union are screw-threadedly tightened together the gradually increasing pressure thus exerted upon the flanged base portion of the rupturable cap, rather than exerting a compressive shearing action thereon, as occurs in certain of the prior safety devices or heads, tends to spread or enlarge the flanged base portion of the cap radially outwardly and to force the same more tightly against its seat between the cooperating parts of the union.

Still another object of the invention is to provide, in one aspect thereof, a novel method of forming the new rupturable cap by molding the same of a selected moldable flexible synthetic resinous or other flexible plastic material and with the rupturable wall rounded off or formed so that it is convex outwardly on its outer surface but is formed with a flat straight surface which extends transversely thereacross on its inner side, and then grinding or machining off the outwardly convex rounded outer surface of the said rupturable wall to the desired extent so that the resulting planar surface thereof lies in a plane parallel to the flat planar inner surface of the said rupturable wall. In this manner a relatively thin flexible rupturable wall of a desired and predetermined uniform thickness is afforded which will flex and rupture under a predetermined gas or vapor pressure and so-called "bubbling" or pin point expansion of the rupturable wall of the cap, that is, excessive swelling of the same at one point therein, as occurs in certain of the prior safety devices, or "ballooning" thereof, are prevented.

Another object of the invention is to construct the new safety device in such a manner that the flexing and rupture pressure point of the flexible rupturable wall of the new safety device may be predetermined and controlled by controlling the variable factors which control the flexing and rupturing of the flexible rupturable wall of the new safety device, namely, (a) thickness of the flexible rupturable wall; (b) the radius of the curved inner shoulder at the junction between the flexible rupturable wall and the side wall of the new safety device; and (c) the thickness of the side wall at the aforesaid curved inner shoulder.

Other and further objects of the present invention will be apparent from the following description and claims and will be understood by reference to the accompanying drawing which, by way of illustration, shows preferred embodiments of the invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawing:

Fig. 1 is a longitudinal sectional view illustrating one form of the present invention and which comprises a molded rupturable cap or disc which is shown as being arranged between the cooperating parts of a flared union having an external vent pipe connected thereto;

Fig. 2 is a transverse sectional view on line 2—2 in Fig. 1;

Fig. 3 is a longitudinal sectional view of another form of the invention, namely, an externally threaded plug adapted to be inserted into a pressure line or into a tapped opening in a pressure vessel and having a relatively thin flexible rupturable wall at one end thereof, this form of the invention having a relatively thin flexible rupturable wall formed as the end or transverse wall of a nipple which is formed integrally with the body of the plug at one end thereof;

Fig. 4 is an end elevational view of the form of the invention shown in Fig. 3 and as seen from the right-hand end in Fig. 3;

Fig. 5 is a longitudinal sectional view illustrating another embodiment of the invention and in which the relatively thin flexible rupturable wall is formed integrally with and at one end of a threaded plug which forms a part of a flared union;

Fig. 6 is an end elevational view of the threaded plug having the rupturable wall at one end thereof and which is embodied in the form of the invention shown in Fig. 5, the plug being shown as seen from the right-hand end in Fig. 5 with the threaded clamping nut and external vent pipe removed;

Fig. 7 is a longitudinal sectional view of another embodiment of the invention and which has the form of an internally threaded nut adapted to be screwed upon the plug of a flared union or upon the externally threaded end portion of a gas or like pressure line, pipe, conduit or the like, this form of the invention having a relatively thin flexible rupturable wall formed as a wall of a nipple which is formed integrally with the body of the nut at one end thereof;

Fig. 8 is an end elevational view of the form of the invention shown in Fig. 7 and as seen from the right-hand end in Fig. 7;

Fig. 9 is a central sectional view illustrating the form and shape of the new molded rupturable cap after the same has been molded and prior to the operation of grinding or machining off the outer surface of the flexible rupturable end wall thereof so as to form a flexible rupturable wall of the desired uniform and controlled thickness;

Fig. 10 is a central sectional view of the rupturable cap shown in Fig. 9 but showing the flexible rupturable wall thereof ground to the desired uniform and controlled thickness;

Fig. 11 is a view of the cap shown in Fig. 10 but showing the same as it appears after it has been arranged in a union such as that in which it is shown in Figs. 1 and 2 and after pressure has been applied by tightening the cooperating threaded plug and nut of the union so as to expand the base flange of the cap radially outwardly while at the same time forcing said base flange firmly against and upon its seat between the cooperating parts of the union; and Fig. 12 is an enlarged fragmentary sectional view of the form of the new safety device which is shown in Fig. 11 and illustrating the three variable factors which are controlled in the practice of the present invention in order to control the flexing and rupture point of the flexible transverse rupturable wall of a safety device made according to the practice of the present invention.

A typical embodiment of the present invention is illustrated in Figs. 1 and 2 of the drawing and the invention is there shown as being embodied in a standard union which is generally indicated at 15 and which comprises an externally threaded and flanged metallic plug 16 which is adapted to be threaded into an internally threaded pipe or conduit of standard size through which gases or vapors under pressure may be adapted to flow, or into a tapped opening in a pressure vessel, or the like. The plug 16 also includes an externally threaded end portion 17 which is internally threaded as at 18 to provide a longitudinally extending bore of predetermined diameter and one end wall of the threaded end portion 17 of the plug is beveled or tapered to provide a shoulder 19. The union 15 also includes an internally threaded clamping nut 20 which is adapted to be screwed onto the externally threaded end portion 17 of the plug 16 and the clamping nut 20 includes a tapered or beveled wall 21 which provides a seat for the base flange 27b of the rupturable cap 25b (Fig. 11), as will be explained presently. In the form of the invention which is shown in Figs. 1 and 2 the clamping nut 20 includes an externally threaded shank 22 to which an external vent pipe as 23 may be detachably connected by means of an internally threaded clamping nut 24.

The form of the invention which is shown in Figs. 1 and 2 includes or embodies the new rupturable cap 25b which is illustrated in Fig. 11 and which may be molded from any suitable flexible elastic synthetic resinous or other synthetic or natural flexible elastic plastic material such as those hereinbefore referred to or equivalent known moldable flexible plastic materials.

As shown in Figs. 1, 11 and 12, the new rupturable cap 25b comprises a body which has a relatively thick side wall 26b having an outwardly flared base flange 27b at one end and a relatively thin flexible transverse rupturable wall 28b at the other end thereof. This base flange initially has the shape and form in which it appears in Fig. 9, wherein it is indicated at 27, but when the rupturable cap 25 (Fig. 9) is inserted into the union 15 (Fig. 1) the cap assumes the form in which it is shown in Figs. 1, 11 and 12 during the operation of tightening the parts of the union together, as will be explained more fully hereinafter.

As also shown in Fig. 1, when the rupturable cap 25b is in position of use in the union 15, the base flange 27b bears upon the seat 21 and is forced tightly against the seat 21 by the tightening of the cooperating externally threaded portion 17 of the plug 16 and the clamping unit 20, and the flexible transverse rupturable wall 28b extends transversely or diametrically across the bore or internal passage formed in the threaded shank 22 of the clamping nut 20.

It will thus be seen that in the embodiment of the invention which is shown in Figs. 1 and 2 of the drawing, the flexible rupturable transverse wall 28b normally obstructs the passage of gas or vapor through the union 15 but in the event that the gas or vapor pressure in the line or pressure vessel with which this embodiment of the invention is associated exceeds a predetermined point, which is related to the known rupturing pressure point of the flexible transverse rupturable wall 28b, the said wall 28b will rupture and allow the gas or vapor in the pressure line or vessel to pass through the thus ruptured cap 25b into the vent 23 and thence to the atmosphere.

It should be noted, in connection with the form of the invention which is shown in Figs. 1 and 2, that certain steps in the method of forming the new rupturable cap 25b which is embodied in the form of the invention shown in Figs. 1 and 2 are illustrated in Figs. 9 and 10 and that the resulting completed rupturable cap is shown in Fig. 10. Thus, Fig. 9 shows the new rupturable cap 25 as it appears when taken from the mold in which it may be molded by means of any suitable compression or injection molding apparatus and from any suitable thermoplastic resinous or other like flexible elastic plastic molding or other composition such as the selected materials hereinabove referred to. When thus removed from the mold the new rupturable cap 25 appears as shown in Fig. 9 with the external diameter of the side wall 26, along a line coincidental with the top of the inner surface of the base flange 27 being approximately twenty-five percent greater than the diameter of the internal bore in the threaded shank 22 of the clamping nut 20 (Fig. 1) and with the base flange 27 thereof being only slightly wider than the outer diameter of the external surface of the side wall 26. Moreover, when the cap 25 is removed from the mold the external surface of the flexible transverse rupturable wall 28 is rounded off or extends convexly outwardly whereas the molded uniplanar inner surface 29 of the flexible transverse rupturable wall 28 is made substantially flat and uniplanar so as to extend at right angles to the longitudinal axis of the cap 25 and across the internal bore or cavity 30 thereof.

After the rupturable cap 25 has been molded into the form in which it is shown in Fig. 9, the outwardly convex external surface of the flexible rupturable transverse wall 28 thereof is ground or machined off to the desired extent so as to form a planar outer surface 28 which then extends substantially parallel to the molded planar inner surface 29a of said rupturable wall, and so that said rupturable wall thus has the desired and a predetermined and controlled thickness and the resulting molded cap appears as shown in Fig. 10. Thus, for example, it has been, for example, found that to resist a gas or vapor pressure of 150 pounds and at a temperature of approximately 110° F. the flexible rupturable wall of a cap as 25b having an internal diameter of ¼" across the midpoint of the internal cavity should have a thickness of approximately 0.010"; to withstand a gas or vapor pressure of 210 lbs. at 110° F. the flexible rupturable wall should have a thickness of approximately 0.012", and so on, and that the flexible rupturable walls of the other forms of the new safety device should be made accordingly; it being understood, in this connection, that as the diameter of the internal cavity is increased the thickness of the flexible rupturable wall is increased proportionately as herein specified.

Accordingly, when the thus formed rupturable cap 25a shown in Fig. 10 is inserted into position of entry at the point where the beveled wall 21 of the clamping nut 20 merges into the wall surface of the internal bore of the threaded shank 22 of the clamping nut 20 of the union 15, Figs. 1 and 2, and the component externally threaded element thereof, namely, the plug 16 and internally threaded clamping nut or component element 20 of the flared union 15 are tightened together, the tapered or beveled wall 19 of the plug 16 and the complementary tapered or beveled wall or seat 21 of the clamping nut 20 cooperate to force the body of the rupturable cap 25a into the internal bore in the threaded shank 22 of the clamping nut 20. This operation forces the rupturable cap 25a into the position of use in which it is shown in Fig. 1 and causes it to assume the form in which it is shown in Figs. 1, 11 and 12, and in so doing forces a part of the material in the side wall of the rupturable cap into the base flange thereof so that the side wall becomes thinner and the base flange is elongated and expanded radially outwardly and the resulting rupturable cap 25b assumes the form in which it is shown in Figs. 1, 11 and 12.

It will be noted, in this connection, that by thus providing the rupturable cap 25a (Fig. 10) with the initially relatively thick side wall 26a (compare the side wall 26a, Fig. 10, with the side wall 26b, Fig. 11) adequate structural strength is imparted to the side wall of the cap to enable it to be forced under pressure into position of use, as in Fig. 1, while, at the same time, causing the resulting side wall 26b and base flange 27b of the cap to form a gas and vapor tight seal with the wall surfaces of the parts 22 and 19—21 with which these parts are thus forced into contact.

It will also be observed, in this connection, that since the thermoplastic resinous material of which the rupture cap 25a is preferably made is relatively hard it is, nevertheless, thus moldable under pressure, and it is believed that the pressure thus exerted on the cap 25a and the resulting heat of friction caused thereby tend to soften at least slightly the resinous material of which the cap 25a is preferably composed so as to facilitate the operation referred to above.

It will be observed, in this connection, that when the new rupturable cap 25b is thus disposed in position of use, as shown in Fig. 1, the pressure of the cooperating plug 16 and clamping nut 20 upon the base flange 27a does not exert a compressible shearing action upon the flexible transverse rupturable wall or diaphragm 28b—29b of the new safety device, as happens in the use of certain prior safety devices, but merely tends to expand the base flange 27a outwardly to form the relatively wide base flange 27b and to secure the same more firmly upon its seat between the cooperating tapered or beveled walls 19 and 21 and thereby provide a seal to prevent leakage of gas or vapor under pressure past the sealed joint thus afforded.

Moreover, it will also be observed that in the embodiment of the invention which is shown in Figs. 1 and 2 the new rupturable cap 25b is arranged entirely within the confines of the union 15—16—17—20 and does not require the use of any relatively large diameter external clamping flanges or rings and associated bolts and nuts heretofore employed for clamping rupturable metal discs or diaphragms in position of use across the bore or internal passage in a pressure line, pipe, conduit or the like in which gas or other fluid is being retained under pressure while, at the same time, the new rupturable cap is so constructed and arranged that when the flexible transverse rupturable wall 28b—29b is ruptured, there is substantially no likelihood of any escape of gas or other fluid through the parts of the union and the gas or other fluid thus released is compelled to flow by way of the vent line 23 to a point where it will be the least harmful.

Furthermore, since the new rupturable cap 25b is preferably molded from a selected flexible resinous molding composition, such as the "Saran" hereinbefore referred to, it is resistant to corrosion by most if not all of the refrigerating gases now in use while at the same time being resistant to corrosion by petroleum products, salt water and other corrosive liquids, gases, vapors and the like which may be contained in a pressure system or vessel with which the new safety device 15 may be employed, or by air or atmospheric moisture or water which may come in contact with the external surface of the cap.

Another modification of the invention is illustrated in Figs. 3 and 4 and comprises a plug 31 which may be made of a selected flexible resinous or other molding or like composition, such as those hereinbefore referred to, and the plug 31 includes a flanged body having an externally threaded portion 32 in which is provided a longitudinally extending bore or cavity 33. In this form of the invention the body 32 of the plug has an outwardly flared nipple 34 formed integrally therewith at one end thereof and the central bore or cavity 33 in the plug is closed by a relatively thin rupturable wall 34a of the nipple 34. This rupturable wall 34a corresponds, in general, to the rupturable wall 28b—29b in the form of the invention shown in Figs. 1 and 11 and in the manufacture of the plug 31 the nipple 34 may be formed with an outwardly convex surface, such as the outwardly convex surface 28 of the rupturable cap 25 shown in Fig. 9 and the outwardly convex surface of the nipple 34 may then be ground or machined off to provide the relatively thin flat and flexible rupturable wall 34a having a controlled flexibility and rupture pressure point as will be discussed more fully hereinafter.

The rupturable plug 31 shown in Figs. 3 and 4 may, of course, be made in various standard sizes to fit various correspondingly sized pipes or tapped openings in pressure lines or vessels so that when the pressure in the bore or central cavity 33 therein reaches a predetermined point, the flexible transverse wall 34a of the nipple 34 will flex and subsequently rupture at a known rupture pressure and thus allow escape of the gas or other fluid normally retained thereby.

Another embodiment of the invention is generally illustrated in Figs. 5 and 6, wherein it is generally indicated at 35, and comprises a flanged plug 36 which may be made of any one of the flexible plastic molding or like compositions hereinbefore referred to for use in making the rupturable cap 25b shown in Figs. 1 and 11. In this form of the invention the plug 36 has an externally threaded end portion 37 which may be made in any desired size to fit a correspondingly threaded opening in a gas pressure line or tapped opening in a pressure vessel or the like and the plug 36 also includes an externally threaded end portion 38 having a flexible rupturable transverse end wall 39 extending across one end thereof so as to close the central bore or longitudinally extending passage 40 in the plug 36. In this form of the invention the externally threaded end portion 38 of the plug 36 is provided with a tapered or beveled wall 41 and a threaded clamping nut 42 arranged upon the plug 36 has a correspondingly tapered or beveled wall 43 to the end that a flanged portion 44 of a vent pipe 45 may be clamped between the beveled walls 41 and 43 of the parts 42 and 38, respectively.

It will thus be seen that when pressure of gas or other fluid in the central cavity or bore 40 of the plug 36 which is embodied in the nut 35 shown in Fig. 5 reaches the rupture point of relatively thin end wall 39, the wall 39 will flex and subsequently rupture and allow the gas or other fluid normally retained thereby to pass therethrough into the vent pipe 45.

In the manufacture of the plug 36 which is embodied in the form of the invention shown in Figs. 5 and 6, the plug 36 may be formed with a rounded outwardly convex wall corresponding to the wall 28 of the cap shown in Fig. 9 and this rounded outwardly convex wall may then be ground or machined off to form the relatively flat flexible rupturable wall 39 of the desired and controlled thickness and flexibility.

A further modification of the invention is illustrated in Figs. 7 and 8 of the drawing, wherein it is generally indicated at 46, and comprises a nut 47 the entire body of which may be made of one of the flexible plastic molding or like compositions hereinbefore referred to for use in making the rupturable cap 25b which is shown in Figs. 1 and 11. In this form of the invention the nut 47 is provided with an internally threaded bore or cavity 48 one end of which is closed by an outwardly flared nipple 49 which is formed integrally with the body of the nut 47 and this nipple 49 has a relatively thin flexible rupturable wall 50 which extends across and normally closes the central passage or cavity 48 in the nut 47.

The nut 46—47 shown in Figs. 7 and 8 may be made in various standard sizes so as to be threaded onto a pipe, conduit or like of a gas or other pressure line or vessel and when the pressure in the central passage or cavity 48 thereof reaches a predetermined point, the relatively thin end wall 50 will flex and subsequently rupture and allow gas or other fluid under pressure retained thereby to pass therethrough to the atmosphere or to a suitable vent which may be associated therewith.

In the manufacture of the form of the invention shown in Figs. 7 and 8, the nipple 49 may be formed with a rounded or outwardly convex surface corresponding to the rounded or outwardly convex surface 28 shown in Fig. 9 and this rounded wall or outwardly convex surface may be ground or machined off to form the relatively thin flat rupturable wall 50, shown in Figs. 7 and 8, of a predetermined and controlled thickness.

In the use of the form of the invention shown in Figs. 7 and 8 the nut 46, being preferably composed of a flexible, resilient resinous material such as vinylidene chloride, will effectively grip an externally threaded pipe or standard size S. A. E. union plug upon which it may be mounted so as to form a gas tight seal therewith without requiring the use of a gasket as in the use of certain of the prior safety devices.

In the practice of the present invention, the flexing and rupture pressure point of the flexible rupturable transverse wall 28b—29b of the new cap shown in Figs. 1 and 11, as well as the flexing and rupture pressure point of the flexible transverse walls 34a, 39 and 50 in the several forms of the invention shown in Figs. 3 and 4, Figs. 5 and 6, and Figs. 7 and 8, respectively, may be controlled by controlling the three variable factors which determine the flexing and rupture pressure point of said flexible rupturable transverse wall, namely, (a) the nature of the material of which said wall is composed and its inherent elasticity and the thickness of said wall; (b) the radius R of the internal surface of the curved shoulder S (Fig. 12) formed by the junction of the side wall 26b and the transverse flexible rupturable wall 28b—29b, in the form of the invention shown in Figs. 1, 11 and 12; and corresponding parts in the forms of the invention which are shown in Figs. 3 and 4, Figs. 5 and 6, and Figs. 7 and 8, respectively; and (c) the thickness of the side wall, as 26b, relative to the thickness of the flexible transverse rupturable wall 28b—29b, along an extension of the radius R (Fig. 12) of the curved shoulder S formed by the junction between the side wall, as 26b, and the flexible rupturable transverse wall, as 28b—29b, in the form of the invention shown in Figs. 1, 11 and 12, or in the corresponding parts which are embodied in the other forms of the invention which are shown in the drawing. By carefully controlling these three variable factors the flexing of the transverse rupturable wall and its rupture pressure point may be controlled and determined and, making due allowance for the nature and characteristics of the particular material employed in making the new safety device, the rupture pressure point of the flexible transverse rupturable wall may be calculated according to the standard A. S. M. E. Code (Unfired pressure vessels) (1940).

I have found, in this connection, that the flexible transverse rupturable wall should be ground down to a point where its thickness at any point 45° in any direction from the center of the rupturable cap 25b is not substantially greater than and is preferably less than the thickness of the shoulder along an extension of the radius R (Fig. 12). Moreover, I have found that the length of the radius R of the curved inner surface of the shoulder S in the new rupturable cap 25b, and the radii of the corresponding curved shoulders in the other forms of the invention shown in the drawing, should preferably not exceed 15 percent of the diameter of the flexible rupturable transverse wall 28b—29b. These factors especially are important since the new safety device is not intended to and does not rupture by bursting at a point but flexes gradually and ruptures by forming a fissure along a diameter line in the transverse rupturable wall.

Furthermore, such a rupture by the formation of the fissure along a diameter of the flexible rupturable wall, where the greater stretching occurs, may be controlled whereas the bursting of a rupturable wall at a pin point, and the ballooning of a rupturable wall, such ballooning being in reality due to a weakness in the structure of the wall, cannot be controlled or maintained within the precise limits required in pressure relief safety devices of the general character as those to which the present invention relates. This is the reason why the flexible rupturable walls 34a and 50 which are embodied in the forms of the invention shown in Figs. 3 and 4 and in Figs. 7 and 8, respectively, are formed as transverse end walls at the outer ends of the nipples 34 and 49, respectively, rather than being formed in the same general plane as the outer surfaces 51 and 52 at the end walls of the plug 31 and nut 46, respectively, and which rupturable walls, if thus formed, would exhibit uncontrollable "ballooning" and bursting under pressure rather than a controlled gradual flexing and a rupturing by formation of a fissure along a diameter of the flexible rupturable wall, as is desired.

It will also be noted that the formation of the relatively thick heavy side wall 26b and the relatively thin flexible rupturable transverse wall 28b—29b in the rupturable cap 25b (Figs. 1 and 11) substantially eliminates any tendency of the rupturable cap to acquire a pin point or bubble swell at the center of or at any other single point in the flexible rupturable wall, as occurs in the use of certain of the prior safety devices, thereby overcoming an objectionable characteristic of such prior safety devices since the rupture point of such pin point swells or bubbles cannot be accurately determined or controlled. Hence in the use of the new rupturable cap 25b the flexible rupturable wall 28b—29b being composed of flexible material and being of substantially uniform thickness throughout its entire extent gradually flexes under the pressure exerted thereon until such pressure reaches the intended rupture pressure point whereupon said flexible rupturable end wall will rupture by forming a fissure substantially along a diameter of said rupturable wall.

Moreover, the nipples 34 and 49 and the flexible rupturable transverse wall 34a and 50 embodied in the forms of the invention shown in Figs. 3 and 4 and in Figs. 7 and 8, respectively, have similar advantageous properties and characteristics and accomplish similar desirable results.

It will be understood that, if desired, and within the scope and contemplation of the present invention the flexible rupturable end wall 28b—29b of the cap 25b and the flexible rupturable end walls in the other forms of the invention which are shown in the drawing may be molded to the desired uniplanar form and thickness although it has been found that it requires relatively expensive molding apparatus and a rather difficult molding operation to obtain the desired accuracy required for the thickness and controlled flexibility of such flexible rupturable walls and hence the more economical method hereinbefore referred to is preferred.

While the parts 16, 20 and 24 of the so-called flared union shown in Figs. 1 and 2, and the nut 42 in the form of the invention shown in Figs. 5 and 6 have been shown and described as being made of suitable metal such, for example, as brass, it will be understood that these parts may also, although less desirably, be made of a vinylidene resin ("Saran") or other suitable flexible elastic plastic composition, if desired, where such parts are not to be exposed to heat such as that generated by fires.

It will be understood that in the practice of the present invention the new rupturable safety caps shown in Figs. 1, 11 and 12, the new rupturable safety plug 31 shown in Figs. 3 and 4, the new rupturable safety flared union element shown in Figs. 5 and 6, and the new rupturable safety nut shown in Figs. 7 and 8 are preferably made from and composed of a selected vinylidene chloride resin copolymerizate which when molded is relatively hard, strong and tough and has a tensile strength of approximately 5000 lbs., so as to provide the necessary desired tensile and structural strength required in the new safety devices but at the same time will enable the thin rupturable wall thereof to flex uniformly under gas or vapor pressure applied thereto.

I claim:

1. The method of forming a safety device adapted for use in conjunction with gas and vapor pressure lines and vessels which comprises forming a hollow body from elastic plastic composition so that said body has an internal cavity and includes a relatively thick side wall and a flexible rupturable wall and so that the said flexible rupturable wall includes a substantially flat straight uniplanar inner surface extending transversely relative to and across the said internal cavity of said hollow body and so that said flexible rupturable wall initially has a rounded outer surface curved convexly outwardly, and then grinding off the said rounded outer surface of said flexible rupturable wall until the outer surface of said flexible rupturable wall is a substantially flat uniplanar surface and extends substantially parallel to the said substantially flat uniplanar inner surface of said flexible rupturable wall so as to provide a flexible rupturable wall of a predetermined and substantially uniform and controlled thickness, relative to the thickness of said side wall, whereby said flexible rupturable wall will flex uniformly outwardly under gas or vapor pressure applied thereagainst from said internal cavity and will rupture by forming a fissure substantially along a diameter line thereof when the internal pressure in said cavity reaches the rupture pressure point of said flexible rupturable wall.

2. The method defined in claim 1 in which the said hollow body is molded with a substantially annular external base flange at one end thereof and in which the said hollow body is formed somewhat larger in its external diameter than the internal diameter of an internally threaded hollow member adapted to have threaded thereinto an externally threaded plug adapted to be threadedly connected to a gas or vapor pressure line or system and having a beveled shoulder formed on its external wall surface and in which the inner surface of said base flange of said hollow body bears upon the external surface of the said beveled shoulder of said plug and in which the said hollow body is forced into the said internally threaded member and said base flange is urged into sealing engagement with the said beveled shoulder of said plug by pressure exerted by the said plug and said internally threaded member when the said plug and said internally threaded member are threaded into engagement with each other, and in which the cooperative action and pressure of the said plug and the said internally threaded member when tightened together expands the said base flange thereof radially outwardly into sealing engagement with a beveled shoulder formed upon the said internally threaded member.

3. The method defined in claim 1 in which the said elastic plastic molding composition is a vinylidene resin.

4. The method defined in claim 1 in which the said hollow body is molded into the form of an externally threaded hollow plug adapted to be threaded into a gas or vapor pressure line or into a tapped opening in a gas or vapor pressure vessel or the like and in which said hollow plug has a nipple formed integrally therewith at one end thereof and in which said flexible rupturable wall is formed as an end wall of said nipple.

5. The method defined in claim 1 in which the said hollow body is molded into the form of an externally threaded hollow plug adapted to be threaded into a gas or vapor pressure line or into a tapped opening in a gas or vapor pressure vessel or the like and in which said hollow plug has an externally threaded shank portion adapted for the reception of an internally threaded clamping nut and in which said hollow plug has a nipple formed integrally therewith at one end thereof and in which said flexible rupturable well is formed as an end wall of said nipple.

6. The method defined in claim 1 in which the said hollow body is molded into the form of an internally threaded nut adapted to be threaded onto a gas or vapor pressure line or the like and in which said nut has a nipple formed integrally therewith at one end thereof and in which said flexible rupturable wall is formed as an end wall of said nipple.

7. A safety device comprising a unitary body composed of an elastic flexible plastic composition and including a side wall and a flexible rupturable end wall, said side wall and said end wall cooperating to define a substantially cylindrical internal cavity in said safety device and the thickness of said side wall being substantially greater at all points therein than the thickness of said flexible rupturable and wall, said flexible rupturable end wall being of substantially uniform thickness throughout its flexible area, the inner surface of said side wall and the inner surface of said flexible rupturable end wall being joined by a curved inner surface and said curved inner surface being defined by a radius the length of which is relatively small compared to the diameter of said flexible rupturable end wall whereby the flexible area of said flexible rupturable end wall is not substantially less than the overall surface area of said flexible rupturable end wall, and the thickness of said safety device at the junction of said side wall with said flexible rupturable end wall being substantially greater than the thickness of the flexible area of said flexible rupturable end wall.

8. A safety device comprising a unitary body composed of an elastic flexible plastic composition and including a side wall and a flexible rupturable end wall, said side wall and said end wall cooperating to define a substantially cylindrical internal cavity in said safety device and the thickness of said side wall being substantially greater at all points therein than the thickness of said flexible rupturable end wall, said flexible rupturable end wall being of substantially uniform thickness throughout its flexible area, the inner surface of said side wall and the inner surface of said flexible rupturable end wall being joined by a curved inner surface and said curved inner surface being defined by a radius the length of which is not substantially greater than fifteen percent of the diameter of said flexible rupturable end wall whereby the flexible area of said flexible rupturable end wall is not substantially less than the overall surface area of said flexible rupturable end wall, and the thickness of said safety device at the junction of said side wall with said flexible rupturable end wall being substantially greater than the thickness of the flexible area of said flexible rupturable end wall.

9. A safety device comprising a unitary body composed of an elastic flexible plastic composition and including a side wall and a flexible rupturable end wall, said side wall and said end wall cooperating to define a substantially cylindrical internal cavity in said safety device and the thickness of said side wall being substantially greater at all points therein than the thickness of said flexible rupturable end wall, said flexible rupturable end wall being of substantially uniform thickness throughout its flexible area, the inner surface of said side wall and the inner surface of said flexible rupturable end wall being joined by a curved inner surface and said curved inner surface being defined by a radius the length of which is relatively small compared to the diameter of said flexible rupturable end wall whereby the flexible area of said flexible rupturable end wall is not substantially less than the overall surface area of said flexible rupturable end wall, and the thickness of said safety device at the junction of said side wall with said flexible rupturable end wall being substantially greater than the thickness of the flexible area of said flexible rupturable end wall, said safety device embodying a clamping flange or skirt portion formed integral with and upon the said side wall thereof on the outer surface of said side wall and at the end of said body opposite the end thereof at which said flexible rupturable end wall is arranged.

10. A safety device comprising a unitary body composed of an elastic flexible plastic composition and including a side wall and a flexible rupturable end wall, said side wall and said end wall cooperating to define a substantially cylindrical internal cavity in said safety device and the thickness of said side wall being substantially greater at all points therein than the thickness of said flexible rupturable end wall, said flexible rupturable end wall being of substantially uniform thickness throughout its flexible area, the inner surface of said side wall and the inner surface of said flexible rupturable end wall being joined by a curved inner surface and said curved inner surface being defined by a radius the length of which is relatively small compared to the diameter of said flexible rupturable end wall whereby the flexible area of said flexible rupturable end wall is not substantially less than the overall surface area of said flexible rupturable end wall, and the thickness of said safety device at the junction of said side wall with said flexible rupturable end wall being substantially greater than the thickness of said flexible rupturable end wall, said safety device embodying a portion formed integral with the side wall thereof and arranged at the end of said side wall opposite the end at which said flexible rupturable end wall is arranged for mounting said safety device in position of use in a gas or vapor pressure line or vessel.

11. A safety device comprising a unitary body including a flexible rupturable wall and a side wall surrounding said flexible rupturable wall and formed integrally therewith, the thickness of said side wall being substantially greater than the thickness of said flexible rupturable wall and said flexible rupturable wall being of substantially uniform thickness throughout its flexible area, the inner surface of said flexible rupturable wall and the inner surface of said side wall being joined by a continuous curved inner surface, and said safety device embodying a clamping portion formed as an integral part of the said unitary body of said safety device and extending outwardly beyond the peripheral edge of the flexible area of said flexible rupturable wall whereby said safety device may be clamped in position of use in a gas or vapor pressure line or vessel by clamping means engaging the said outwardly extending clamping portion of the said unitary body and without exerting a clamping or shearing action upon the said flexible rupturable wall itself.

12. A safety device as defined in claim 7 in which the said body is substantially cup-shaped and includes a substantially annular base flange at one end thereof and in which the said safety device comprises an internally threaded member having a central longitudinally extending internal passage therein and in which the said cup-shaped body is disposed in the said central longitudinally extending passage in said internally threaded member and in which the said flexible rupturable wall of said cup-shaped body extends transversely across and closes the said central longitudinally extending passage in said internally threaded member, and in which said safety device includes a member having an externally threaded surface adapted to be threaded into engagement with the said internally threaded member so as to retain said substantially cup-shaped body therebetween, and in which said externally threaded member has a central longitudinally extending internal passage in communication with the interior of said substantially cup-shaped body when the said internally threaded member and the said externally threaded member are in threaded engagement with each other with the said substantially cup-shaped member disposed therebetween.

13. A safety device as defined in claim 7 in which the said body is substantially cup-shaped and includes a substantially annular base flange at one end thereof and in which the said safety device comprises a component element of a flared union having a central longitudinally extending internal passage therein, and in which the said body is disposed in the said central passage in said component element of a flared union, and in which the said flexible rupturable wall of said body extends transversely across and closes the said central passage in said flared union element, and in which the said safety device includes an internally threaded nut adapted to be threaded onto said flared union element, and in which said safety device includes a vent pipe secured by said nut to the said flared union element at one end of and in communication with said central longitudinally extending passage therein.

14. A safety device as defined in claim 7 in which the said body is substantially cup-shaped and includes a substantially annular base flange at one end thereof, and in which the said safety device comprises an internally threaded member having a central longitudinally extending internal passage therein, and in which the said cup-shaped body is disposed in the said central longitudinally extending passage in said internally threaded member, and in which the said flexible rupturable wall of said cup-shaped body extends transversely across and closes the said central longitudinally extending passage in said internally threaded member, and in which said safety device includes a member having an externally threaded surface adapted to be threaded into engagement with the said internally threaded member so as to retain said substantially cup-shaped body therebetween, and in which said externally threaded member has a central longitudinally extending internal passage in communication with the interior of said substantially cup-shaped body when the said internally threaded member and the said externally threaded member are in threaded engagement with each other with the said substantially cup-shaped member disposed therebetween, and in which said internally threaded member and said externally threaded member each have a beveled wall surface, and in which said beveled wall surfaces cooperate with each other to clamp a portion of said substantially cup-shaped body therebetween.

15. A safety device as defined in claim 7 in which the said body is substantially cup-shaped and includes a substantially annular base flange at one end thereof and in which the said safety device includes an internally threaded member having a central longitudinally extending passage therein and in which the said body is disposed in the said central longitudinally extending passage in said member so that the said flexible rupturable wall of said body normally extends across and closes said passage, and in which said member includes a beveled wall portion, and in which said safety device includes an externally threaded plug adapted to have threaded engagement with the said internally threaded member and includes a beveled wall portion, and in which the said beveled wall portions of the said internally threaded member and of the said externally threaded plug cooperate to act upon the said annular base flange of said body to force the said body into the said central longitudinally extending passage in said internally threaded member when the said internally threaded member and the said externally threaded plug are threaded into engagement with each other.

16. A safety device as defined in claim 7 in which the said hollow body is substantially cup-shaped and includes a substantially annular base flange at one end thereof and in which the said safety device includes an internally threaded member having a central longitudinally extending passage therein, and in which the said body is disposed in the said passage so that the said flexible rupturable wall of said body normally extends across and closes said passage to the passage of gas or vapor therethrough, and in which said member includes a beveled wall portion, and in which said safety device includes an externally threaded plug having a central longitudinally extending passage adapted to be connected to a pressure line or vessel, and in which said plug is threadedly connected to said member and includes a beveled wall portion, and in which the said beveled wall portion of the said member and the said beveled wall portion of said plug cooperate to force the said substantially annular base flange of said body into sealing engagement therebetween, and in which the said internally threaded member includes an externally threaded shank, and in which the said safety device includes a clamping nut adapted to be threaded onto the said externally threaded shank of said internally threaded member, and in which the said externally threaded shank portion of said member and said clamping nut cooperate to secure a portion of an external vent pipe thereto and in communication with the said central longitudinally extending passage in the said internally threaded member.

17. A safety device as defined in claim 7 in which the said body is in the form of an externally threaded plug adapted to be threaded into a gas or vapor pressure line or into a tapped opening in a gas or vapor pressure vessel or the like and in which the said plug has said flexible rupturable wall formed integrally therewith at one end thereof.

18. A safety device as defined in claim 7 in which the said body is in the form of an externally threaded plug adapted to be threaded into a gas or vapor pressure line or into a tapped opening in a gas or vapor pressure vessel or the like and in which said plug has a nipple formed integrally therewith at one end thereof and in which the body of said nipple projects beyond the main body of the said plug and in which the said flexible rupturable wall is formed as the outer end wall of said nipple.

19. A safetly device as defined in claim 7 in which said body is in the form of a plug having a central longitudinally extending passage therein and in which the said plug includes an externally threaded end portion adapted to be threaded into a pressure line or into a tapped opening in a pressure vessel, and in which the said plug includes a second externally threaded end portion having said flexible rupturable wall formed integrally therewith at one end thereof and normally extending transversely across and closing the said centrally longitudinally extending passage, and in which said second externally threaded end portion of said plug has a clamping nut threaded thereon and in which a portion of a vent pipe is clampingly secured to the said plug by means of said clamping nut.

20. A safety device as defined in claim 7 in which said body is in the form of a plug having a central longitudinally extending passage therein and in which the said plug includes an externally threaded end portion adapted to be threaded into a pressure line or into a tapped opening in a pressure vessel and in which the said plug includes a second externally threaded end portion adapted to receive a clamping nut for securing a vent pipe in communication with the said central longitudinally extending passage in said plug, and in which the said second externally threaded end portion of said plug has said flexible rupturable wall formed integrally therewith at one end thereof, and in which the said second threaded end portion of the said plug includes a beveled external wall surface, and in which said safety device includes a vent pipe having a flange portion bearing upon the said beveled external wall surface of said plug, and in which said safety device includes an internally threaded clamping nut threaded onto the said second externally threaded end portion of said plug, and in which said clamping nut includes a beveled inner wall surface bearing upon the said flange portion of said vent pipe and urging the same into sealing engagement with the said beveled external wall surface of the said plug.

21. A safety device as defined in claim 7 in which the said body is in the form of an internally threaded nut having said flexible rupturable wall formed integrally therewith at one end thereof.

22. A safety device as defined in claim 7 in which the said body is in the form of an internally threaded nut having a nipple formed integrally therewith at one end thereof and in which the said nipple projects beyond one end wall of the body of said nut and in which the said flexible rupturable wall is formed as one end wall of the said nipple.

23. A safety device as defined in claim 7 which is composed of a vinylidene chloride resin.

24. A safety device as defined in claim 11 in which said body is composed of an elastic flexible plastic composition.

25. A safety device as defined in claim 11 in which said body is composed of a vinylidene chloride resin.

26. A safety device as defined in claim 11 in which said flexible rupturable wall is flexible throughout substantially its entire area and in which the said flexible area of said flexible rupturable wall is defined by the juncture of the peripheral edge of the said flexible rupturable wall with the said side wall of said safety device.

JAMES J. McKEAGUE.